(12) United States Patent
McEvilly

(10) Patent No.: US 9,769,795 B2
(45) Date of Patent: Sep. 19, 2017

(54) METHODS, A BROADCAST MANAGEMENT UNIT AND A USER EQUIPMENT FOR HANDLING DIGITAL CONTENT IN A CELLULAR COMMUNICATIONS NETWORK

(71) Applicant: Telefonaktiebolaget L M Ericsson (publ), Stockholm (SE)

(72) Inventor: Chris McEvilly, Bagshot (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 14/434,223

(22) PCT Filed: Oct. 9, 2012

(86) PCT No.: PCT/EP2012/069970
§ 371 (c)(1),
(2) Date: Apr. 8, 2015

(87) PCT Pub. No.: WO2014/056527
PCT Pub. Date: Apr. 17, 2014

(65) Prior Publication Data
US 2015/0282119 A1 Oct. 1, 2015

(51) Int. Cl.
*H04W 72/00* (2009.01)
*H04W 4/06* (2009.01)
(Continued)

(52) U.S. Cl.
CPC ......... *H04W 72/005* (2013.01); *H04L 12/189* (2013.01); *H04L 67/306* (2013.01);
(Continued)

(58) Field of Classification Search
CPC .................................................. H04W 72/005
See application file for complete search history.

(56) References Cited

U.S. PATENT DOCUMENTS 7,558,587 B2   7/2009  Albal et al.
8,417,952 B2 * 4/2013  Cheng ............... G06F 21/10
                                              713/171
(Continued)

FOREIGN PATENT DOCUMENTS

EP    2120395 A1    11/2009
WO    2006110322 A2  10/2006

OTHER PUBLICATIONS

International search report and written opinion dated Jul. 10, 2013 for International application serial No. PCT/EP2012/071710, International filing date Nov. 2, 2012, 10 pages.

(Continued)

*Primary Examiner* — Andrew Lai
*Assistant Examiner* — Andrew C Lee
(74) *Attorney, Agent, or Firm* — Rothwell, Figg, Ernst & Manbeck, p.c.

(57) ABSTRACT

A method in, and a Broadcast Management unit (163) for recommending and providing digital content to a user equipment (120), and a method in and a user equipment (120) for accessing recommended digital content. The user equipment is served by a base station in a cellular communications network. The Broadcast management unit decides (301, 401, 501) to recommend a digital content to the user equipment (120) and one or more additional user equipments (121, 122, 123) and provides broadcast or multicast of the digital content in a service area (105. The user equipment registers (306; 409; 701) a request for one or more digital contents that are recommended and then identifies, in response to the registered request, a digital content that is recommended and available from broadcast or multicast by the base station (110). The user equipment (120) displays (309, 411, 703), in response to the identified digital content, a representation of (Continued)

the digital content, which representation is selectable for access to the digital content.

32 Claims, 8 Drawing Sheets

(51) Int. Cl.
*H04L 12/18* (2006.01)
*H04L 29/08* (2006.01)
*H04W 24/10* (2009.01)
*H04W 84/04* (2009.01)
*H04W 88/08* (2009.01)

(52) U.S. Cl.
CPC ............ *H04W 4/06* (2013.01); *H04W 24/10* (2013.01); *H04W 84/042* (2013.01); *H04W 88/08* (2013.01)

(56) References Cited

U.S. PATENT DOCUMENTS

| | | | |
|---|---|---|---|
| 8,527,648 B2 | 9/2013 | Liu et al. | |
| 2002/0019228 A1* | 2/2002 | McKenna | H04W 8/26 455/435.1 |
| 2004/0054787 A1* | 3/2004 | Kjellberg | G06F 17/30905 709/228 |
| 2005/0172154 A1* | 8/2005 | Short | H04H 60/23 726/5 |
| 2006/0126556 A1* | 6/2006 | Jiang | H04L 12/18 370/328 |
| 2007/0168523 A1 | 7/2007 | Jiang et al. | |
| 2008/0008176 A1* | 1/2008 | Lim | H04W 72/005 370/390 |
| 2008/0051026 A1* | 2/2008 | Kim | H04W 72/005 455/3.01 |
| 2008/0056219 A1* | 3/2008 | Venkatachalam | H04W 72/005 370/342 |
| 2008/0069071 A1 | 3/2008 | Tang | |
| 2010/0058422 A1 | 3/2010 | Ochiai | |
| 2010/0136943 A1* | 6/2010 | Hirvela | H04W 4/00 455/404.1 |
| 2010/0188975 A1* | 7/2010 | Raleigh | G06Q 10/06375 370/230.1 |
| 2011/0085489 A1* | 4/2011 | Rydnell | H04W 72/005 370/312 |
| 2012/0064820 A1* | 3/2012 | Bemmel | G08G 1/0141 455/3.02 |
| 2012/0131076 A1 | 5/2012 | Chen | |
| 2012/0295570 A1* | 11/2012 | Roin | H04W 4/02 455/404.1 |

OTHER PUBLICATIONS

3GPP TS 25.346 V9.1.0 (Mar. 2010) 3rd Generation Partnership Project: Technical Specification Group Radio Access Network; Introduction of the Multimedia Broadcast/Multicast Service (MBMS) in the Radio Access Network (RAN); Stage 2 (Release 9) Mar. 2010, 71 pages.
3GPP TS 23.246 V9.6.0 (Dec. 2011) 3rd Generation Partnership Project; Technical Specification Group Services and System Aspects; Multimedia Broadcast/Multicast Service (MBMS); Architecture and functional description (Release 9) Dec. 2011, 65 pages.
3GPP TS 36.300 V9.9.0 (Dec. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 9) Dec. 2011, 173 pages.
3GPP TS 26.346 V9.7.0 (Jun. 2012) 3rd Generation Partnership Project; Technical Specification Group Services and System Aspects; Multimedia Broadcast/Multicast Service (MBMS); Protocols and codecs (Release 9) Jun. 2012, 166 pages.
Non-Final Office Action in U.S. Appl. No. 14/430,415 dated Apr. 19, 2016, 27 pages.
Non-Final Office Action issued in U.S. Appl. No. 14/430,415, dated Feb. 23, 2017, 27 pages.

\* cited by examiner

METHODS, A BROADCAST MANAGEMENT UNIT AND A USER EQUIPMENT FOR HANDLING DIGITAL CONTENT IN A CELLULAR COMMUNICATIONS NETWORK

CROSS-REFERENCE TO RELATED APPLICATION

This application is a 35 U.S.C. §371 National Phase Entry Application from PCT/EP2012/069970, filed Oct. 9, 2012, and designating the United States.

TECHNICAL FIELD

Embodiments herein relate to a method in a Broadcast Management unit, a Broadcast Management unit, a method in a user equipment and a user equipment. In particular embodiments herein relate to recommending and providing digital content to a user equipment in a cellular communications network.

BACKGROUND

Communication devices such as User Equipments (UEs) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular network. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile device, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. By the base station serving a cell is meant that the radio coverage is provided such that one or more user equipments located in the geographical area where the radio coverage is provided may be served by the base station. One base station may serve one or several cells. Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the user equipment. The expression uplink (UL) is used for the transmission path in the opposite direction i.e. from the user equipment to the base station.

In a cellular communications network various services are provided, via base stations to user equipments being served in the cells thereof, such as voice communication services and data services available on or via the Internet, or other local data networks. The data services may be services available on the World Wide Web (WWW), typically accessible to a user equipment via a web browser application installed thereon, or data services that are available via other protocols and/or relevant only to more specific applications or software installed on the user equipment. Using such data services involves download of digital content to the user equipment. Certain parts of the cellular communications network are responsible for identifying user equipments that request such data services and then makes sure that the service is provided to the user equipment via the base station serving the user equipment, preferably in such way that the user of the user equipment does experience any negative impact from the fact that the service is provided via the cellular communications network. For example, a user that uses an application executing on a user equipment, e.g. a web browser, for accessing digital content on the Internet, simply wants the access without having to care of, or be negatively affected, by the fact that the connection is via the cellular communications network.

However, there are certain problems associated with the desire to provide such user experience. One problem is the fact the there is a limited bandwidth in each cell and thereby restrictions in how many user equipments that may be guaranteed a certain quality of service at the same time. By a continuously increasing number of user equipments and increasing usage of data services in cellular communications networks of today, the problem is becoming increasingly greater. Even if the overall capacity is increased there will still be a certain maximal amount of bandwidth available in each cell for the delivery of digital content for the data services, and there may be usage peaks where it would be desirable to provide digital content to user equipments in a cell at such amount and rate that would exceed the capacity of the cell. When this happens the result is a poor user experience, e.g. bad performance of the data service, errors in the digital content and/or data service, or even non-access to the requested digital content or non-availability of the data service.

SUMMARY

An object of embodiments herein is to provide a way of improving the performance in a cellular communications network.

According to a first aspect of embodiments herein, the object is achieved by a method in a Broadcast Management unit for recommending and providing digital content to a user equipment. The user equipment is served by a base station in a cellular communications network. The base station is comprised in a radio access network of the cellular communications network. The Broadcast Management unit is comprised in a core network of the cellular communications network. The Broadcast Management unit decides to recommend a digital content to the user equipment and one or more additional user equipments. The Broadcast Management unit provides, in response to the decision, broadcast or multicast of the digital content in a service area. Thereby it is enabled reception of the digital content by the user equipment via the base station and by said one or more additional user equipments in the service area.

According to a second aspect of embodiments herein, the object is achieved by a method in a user equipment for accessing recommended digital content. The user equipment is served by a base station in a cellular communications network. The user equipment registers a request for one or more digital contents that are recommended. In response to the registered request, the user equipment identifies a digital content that is recommended and available from broadcast or multicast by the base station. The user equipment displays, in response to the identified digital content, a representation of the digital content, which representation is selectable for access to the digital content.

According to a third aspect of embodiments herein, the object is achieved by a Broadcast Management unit for recommending and providing digital content to a user equipment. The user equipment is served by a base station in a cellular communications network. The base station is comprised in a radio access network of the cellular communications network. The Broadcast Management unit is comprised in a core network of the cellular communications network. The Broadcast Management unit comprises a deciding circuitry, configured to decide to recommend a digital content to the user equipment and one or more additional user equipments. The Broadcast Management unit further comprises a providing circuitry, configured to, in response to the decision, provide broadcast or multicast of the digital content in a service area. Thereby it is enabled reception of the digital content by the user equipment via the base station and by said one or more additional user equipments in the service area.

According to a fourth aspect of embodiments herein, the object is achieved by a user equipment for accessing recommended digital content. The user equipment is configured to be served by a base station in a cellular communications network. The user equipment comprises a registering circuitry, configured to register a request for one or more digital contents that are recommended. The user equipment further comprises an identifying circuitry, configured to identify, in response to the registered request, a digital content that is recommended and available from broadcast or multicast by the base station. Moreover, the user equipment comprises a displaying circuitry, configured to display, in response to the identified digital content, a representation of the digital content, which representation is selectable for access to the digital content.

By digital content is here meant digital content that is provided by services available to the user equipment. The digital content is typically data from the internet, e.g. available on the World Wide Web (WWW), often referred to as web content, but may also be other kind of digital content. For example, digital content may relate to a web radio transmission for reception by an application running on the user equipment, a video clip for view on the user equipment, a web-page for execution and display using a web-browser executing on the user equipment, application specific digital content, a downloadable new firmware or application for execution on the user equipment, just to mention some examples. The digital content may correspond to a single data file or a group of data files. The digital content may be live and/or streamed digital content.

As should be realized, by providing broadcast or multicast of digital content instead of by unicast, the result is sending and addressing of one and the same copy of the digital content to the user equipment and the one or more additional user equipments, i.e. multiple user equipments, at the same time. This instead of sending and addressing a separate copy of the digital content to each one of the multiple user equipments as in the case of unicast. Thus multiple unicast downlink transmissions, one for each one of the user equipment and the one and more additional user equipments, where each unicast transmission requires a certain bandwidth, are possible to replace by the provided broadcast or multicast with a bandwidth that is independent on the number of receiving user equipments.

Hence, by recommending digital content, make it available from broadcast or multicast and displaying the representation of the recommended digital content, in accordance with the above aspects of embodiments herein, users will be inspired to access the digital content that is recommended, which will reduce the demand for same or corresponding digital content by unicast and thereby also reduce the risk of capacity overload in the service area and in a cell where the user equipment is served. The broadcast or multicast also enables delivery of the digital content to each receiving user equipment at higher speed and/or better quality of service than if the digital content was to be delivered by multiple unicast transmissions.

Further advantages for example include:

By making user equipments receive digital content by broadcast or multicast instead of by unicast, reduced signaling in the cell and the service area is enabled and less resources may need to be allocated. For example, in LTE less resource blocks may need to be allocated for specific user equipments.

Bandwidth may be freed and used for other purpose and/or it is enabled to improve the user experience by e.g. deliver the digital content at higher rates while allocating the same or even less bandwidth in the cell.

BRIEF DESCRIPTION OF THE DRAWINGS

Examples of embodiments herein are described in more detail with reference to the appended schematic drawings, in which.

DESCRIPTION

Multimedia Broadcast Multicast Services (MBMS) is a point-to-multipoint interface specification for existing and upcoming 3GPP cellular networks, which is designed to provide efficient delivery of broadcast and multicast services. See for example:

ETSI TS 123 246 V9.6.0 (2012-01): Universal Mobile Telecommunications System (UMTS); LTE; Multimedia Broadcast/Multicast Service (MBMS); Architecture and functional description (3GPP TS 23.246 version 9.6.0 Release 9), ETSI TS 125 346 V9.1.0 (2010-04): Universal Mobile Telecommunications System (UMTS); Introduction of the Multimedia Broadcast/Multicast Service (MBMS) in the Radio Access Network (RAN); Stage 2 (3GPP TS 25.346 version 9.1.0 Release 9), and ETSI TS 136 300 V9.9.0 (2012-01): LTE; Evolved Universal Terrestrial Radio Access (E-UTRA) and Evolved Universal Terrestrial Radio Access Network (E-UTRAN); Overall description; Stage 2 (3GPP TS 36.300 version 9.9.0 Release 9), Section 15 MBMS.

MBMS for LTE may generally be referred to as evolved MBMS (eMBMS). The embodiments herein are compatible with and may preferably be implemented in a cellular communications network, in particular LTE-based, that support MBMS, i.e. eMBMS. This should be appreciated by the skilled person from the examples that will follow.

Figure 1:
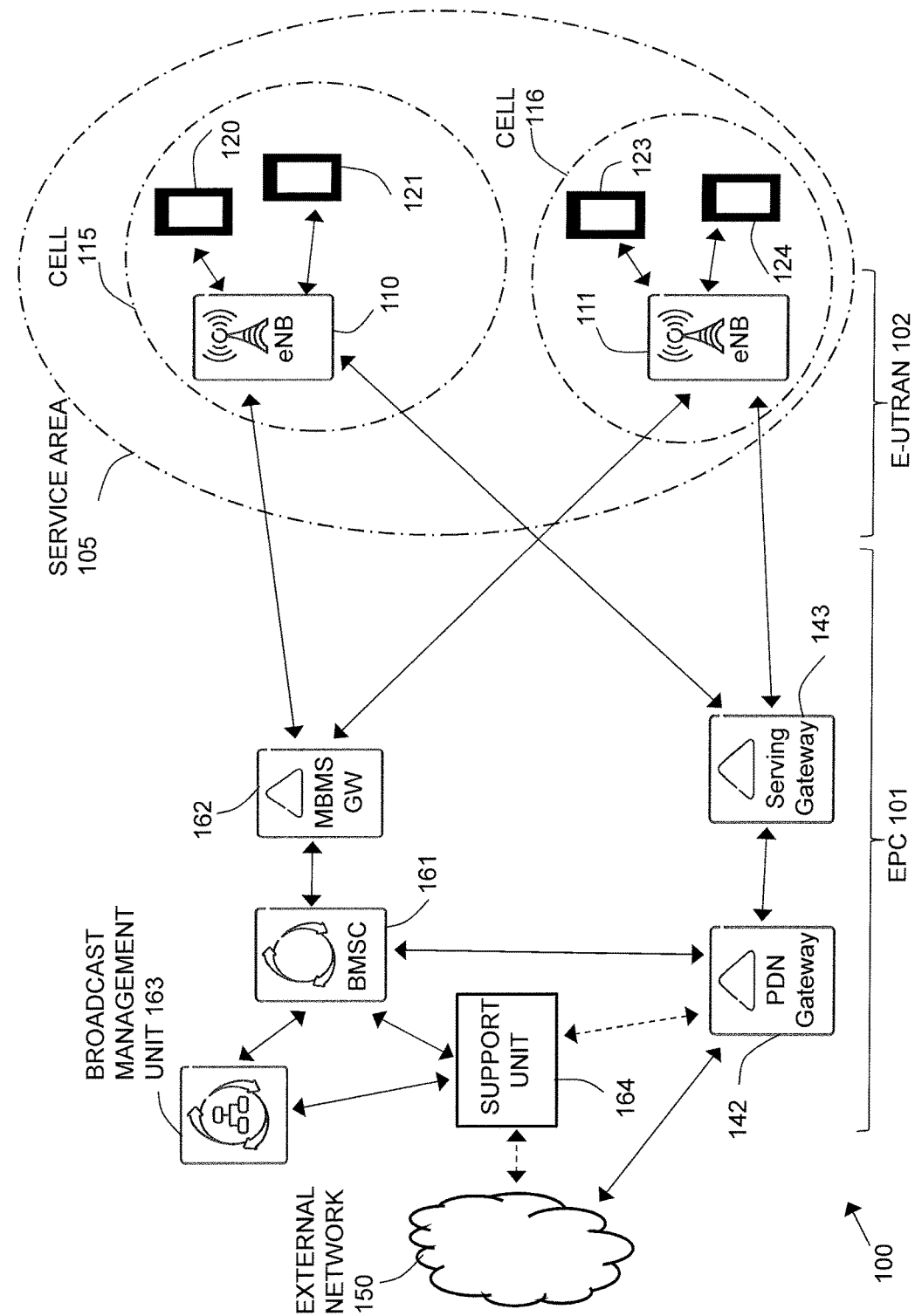
FIG. 1 is a schematic block diagram depicting an example of a cellular communications network.

FIG. 1 is a schematic block diagram depicting an example of a cellular communications network 100. In the shown example the cellular communications network 100 corresponds to an LTE based network, as should be recognized by the skilled person. As indicated in the figure, the network 100 comprises an Evolved Packet Core (EPC) network 101, being example of a core network, and an Evolved UMTS Terrestrial Radio Access Network (E-UTRAN) 102, being example of a RAN.

The shown cellular communications network 100 further comprises a base station 110 serving a cell 115 and a base station 111 serving a cell 116. The base stations 110, 111 are named eNB in the figure, which is the common denomination used for a base station in LTE-based networks.

Located and served in cell 115 is a first user equipment 120 and a second user equipment 121 and located and served in cell 116 is a third user equipment 122 and a fourth user equipment 123. The enumerated naming is only for exemplary reasons and in the following the user equipments 121-123 may be referred to as additional user equipments. Both the cell 115 and the cell 116 are located in a service area 105. The service area 105 may be defined by the cells that it comprises or may defined by a geographical area and thereby will comprise cells in the same geographical area. The service area 105 will be further discussed below.

The shown arrows in FIG. 1 indicate paths for communication of user plane data, such as communication of digital content that may result from that the user equipments 120, 121, 122, 123, are utilizing data services provided in the cellular communications network 100 for accessing digital content.

Still referring to FIG. 1, the cellular communications network 100 further comprises a Packet Data Network (PDN) Gateway 142 and a Serving Gateway 143, as known from LTE. The PDN Gateway 142 is an example of an interface between an internal IP network of the operator of the cellular communication network 100 and an external network 150. The external network 150 may e.g. be the Internet. In LTE, the Serving Gateway 143 has a main task of tunnelling user plane data between the PDN Gateway 142 and the base stations 110, 111. The PDN Gateway 142 and the Serving Gateway 143 are logical units in LTE, which logical units may be implemented in the same physical unit, but more typically in separate physical units and as separate network nodes in the cellular communications network 100, in particular in the EPC network 101 thereof.

The shown cellular communications network 100 also comprises a MBMS GateWay (MBMS GW) 162 and a Broadcast Multicast Service Center (BMSC) 161. The general role, task and interrelations of the MBMS GW 162 and a BMSC 161 may be in accordance with the above mentioned 3GPP specifications relating to MBMS for LTE, i.e eMBMS. Hence, the MBMS GW 162 may i.a. provide functionality for sending of MBMS packets comprising the digital content to the base stations 110, 111 for broadcast or multicast in the cells 115, 116. The MBMS GW 162 may use IP multicast as a means for forwarding MBMS user plane data, such as the digital content in the MBMS packets, to the base stations 110, 111. Note that this may be the case even though the digital content is being provided by broadcast in the respective cells. The BMSC 161 may i.a. be responsible for delivering user plane data, such as the digital content, to the MBMS GW 162. The BMSC 161 may also provide a number of service layer function such as Forward Error Correction (FEC) and file Repair in order to ensure Quality of Service (QoS) in delivery of the digital content to the user equipments 120, 121, 122, 123. Also, Service Announcements of what is available by broadcast or multicast to the user equipments 120, 121, 122, 123, such as the first user equipment 120, may be provided as a service layer function by the BMSC 161.

The shown cellular communications network 100 also comprises a Broadcast Management unit 163 for providing the digital content to the user equipments 120, 121, 122, 123, by e.g. controlling the BMSC 161, directly, via and/or with support from one or more support units 164 that will be further discussed below. The Broadcast Management unit 163 may e.g. be involved in and/or responsible for deciding what digital content to provide and when and where it shall be provided for the broadcast or multicast. Or in other words, the Broadcast Management unit 163 may be involved in and/or responsible for providing, planning and scheduling the provision the digital content for the broadcast or multicast. The Broadcast Management unit 163 may also be involved in and/or responsible for monitoring tasks, archiving tasks, and/or provide support to various organizations, typically within or connected to the operators of the cellular communications network 100, such as to network operations, service operations, customer care and also co-operating organizations, e.g. service providers of digital content. The Broadcast Management unit 163 will be further discussed below. The MBMS GW 162 and the BMSC 161 are logical units, which may be implemented in a respective corresponding physical unit or units, or together with other logical units or functionality in one or more shared physical units. Furthermore, the MBMS GW 162 and the BMSC 161 typically represent separate network nodes in the cellular communications network 100, more particularly in the EPC network 101 thereof. The Broadcast Management unit 163 is a logical unit that may be implemented in a corresponding physical unit or units, or together with other logical units or functionality in one or more shared physical units. The Broadcast Management unit 163 may, but not necessary, correspond to a network node in the cellular communications network 100, such as in the EPC 163 in case of an LTE based cellular communications network 100.

As illustrated in FIG. 1, the cellular communications network 100 may further comprise one or more support units 164 that may be communicatively connected to the BMSC 161, the Broadcast Management unit 163 and/or to each other. The one or more support units 164 may e.g. comprise a content providing unit and/or a data carousel providing unit and/or a scheduling unit. The content providing unit may e.g. provide digital content from one or more sources to the BMSC 161 and/or to the data carousel providing unit. Digital content and examples thereof are discussed in some detail below. One source may be the external network 150, e.g. the Internet, from which the digital content may be retrieved via the PDN Gateway 142 or via some other connection. Another source may be digital content provided by e.g. the operator of the cellular communication network 100 exclusively for the broadcast or multicast, and which digital content thus may not be available from or via the external network 150. Yet another source may be one or more encoders or re-encoders for content that is relevant to transform before being subject to broadcast or multicast, e.g. analogue content and/or content in an inappropriate digital format. For example, digital content produced for another kind of system, e.g. television, such as video content from television satellites may be inappropriate to use directly in a network based on LTE and eMBMS. The content providing unit may further comprise and/or be configured to retrieve digital content from one or more storages in the cellular communications network 100, typically in the EPC network 101. The one or more storages may be comprised in the content providing unit. Some or all of the one or more storages may be in a physical unit that corresponds to the content providing unit, and/or some or all of the one or more storages may be in one or more physical units that are separate from a physical unit comprising the content providing unit. Digital content that has been stored in and is available from the one or more storages in the cellular communications network 100 enable a faster response to a decision to provide the digital content by broadcast or multicast and may also guarantee availability and quality of the digital content to be used for the broadcast or multicast. In some embodiments, one or more such storages may be connected to the PDN Gateway 142 and the BMSC 161 and be configured, e.g. via the PDN Gateway 142, to store digital content that is a candidate to be recommended and to be provided by the broadcast or multicast. The Broadcast Management unit 163 may be responsible for configuring what and when to store something in the one or more storages. For example, the one or more storages may be configured to store all, or certain types of, digital content but only keep it in the one or more storages during a certain time period when it is or is expected to be a candidate for recommendation. As will be further discussed below, a decision to provide the digital content by broadcast or multicast may be based on one or more measures and/or parameters. Some of the measures and/or parameters may correspond to threshold values. For a decision to store the digital content in advance in the one or more storages, as a candidate for recommendation, a corresponding but somewhat less restrictive threshold value than for taking the actual decision may be used. This may be used to guarantee availability of the digital content in the one or more storages when/if a decision is taken to recommend and provide the digital content by broadcast or multicast.

Still referring to FIG. 1 and the one or more support units 164. The scheduling unit that may be comprised in the one or more support units 164 may e.g. provide information about when to start and/or stop and/or change the broadcast or multicast, e.g. when to add or remove the digital content from the broadcast or multicast. The data carousel providing unit that may be comprised in the one or more support units 164 may e.g. provide a data carousel where digital content that has been retrieved for the broadcast or multicast is inserted. By broadcast of the data carousel, the digital content will repeatedly occur in the broadcast or multicast. As should be understood, a data carousel is manly relevant for digital content corresponding to data files but typically not for streaming data. For example, by providing a file of digital content in a data carousel, the file of digital content is made more suitable for continuous broadcast or multicast and to be provided by broadcast or multicast at the same time together with other digital content. The other digital content may be comprised in the same or another data carousel, or may be such that is already provided as a data stream, e.g. a web radio transmission. The scheduling unit may operate directly on the data carousel providing unit so that a data carousel comprising properly scheduled digital content may be provided to the BMSC 161. By digital content comprised in a data carousel may be referred to data format and or structure where one or more copies of the digital content may be interleaved with other data and where the format and/or structure is for sending in a repeating pattern. Sending of the data carousel may thus result in repeated sending of digital contend, corresponding to a data stream where copies of the digital content repeatedly will occur.

In some embodiments, one or more support units 164 may be a respective logical unit that may be implemented in one and the same physical unit as e.g. the BMSC 161 or the Broadcast Management unit 163. In some embodiments, one or more support units 164 may be a respective logical unit that corresponds to a separate physical unit.

Figure 2:
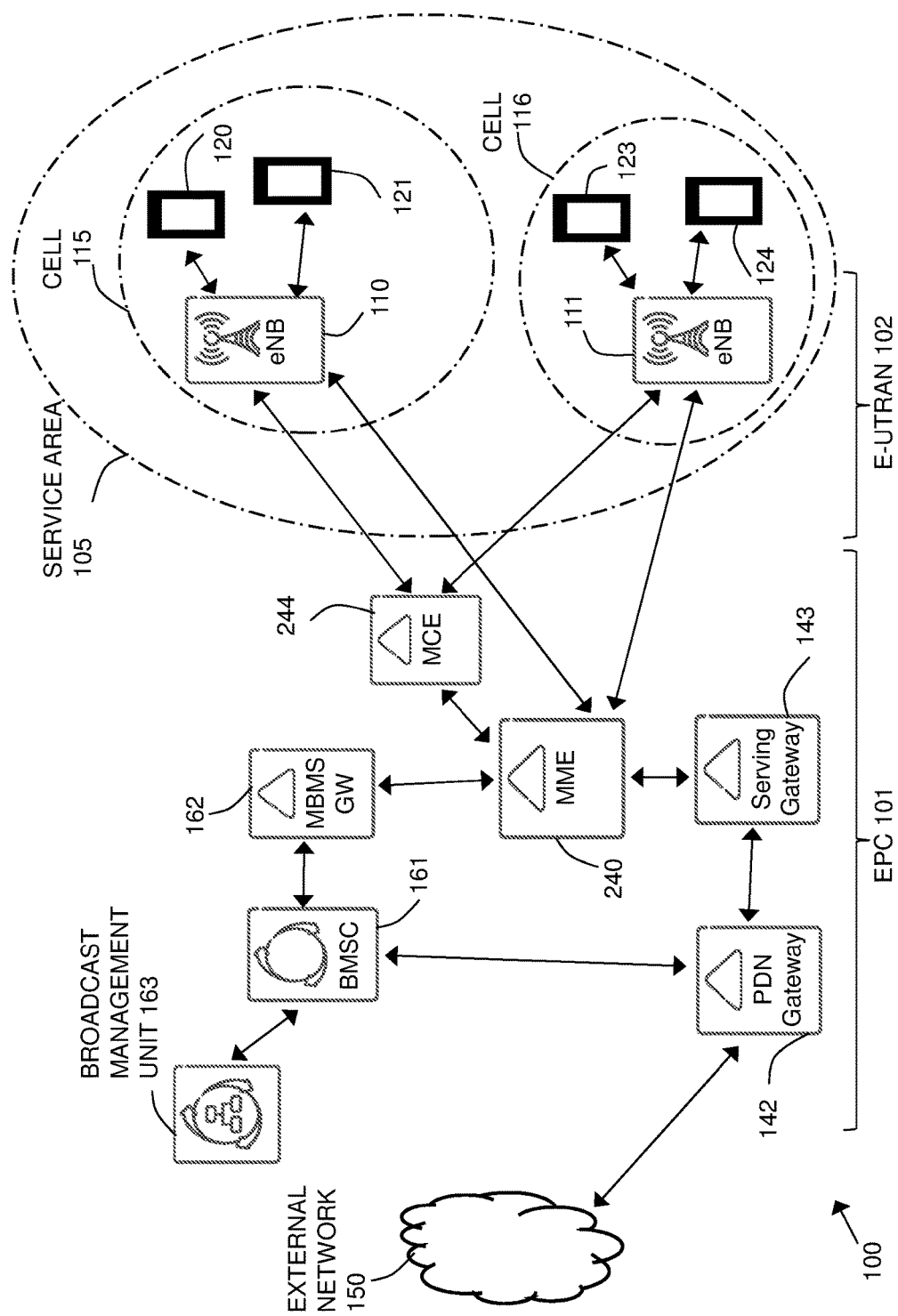
FIG. 2 is a schematic block diagram depicting another view of the example in FIG. 1.

FIG. 2 is a schematic block diagram depicting another view of the example in FIG. 1, here regarding session control signalling, instead of communication of user plane data as in FIG. 1. The two different view are for reducing complexity in each view for readability reasons. The difference between session control signalling and communication of user plane data, should be well known to the person skilled in cellular communications network, in particular LTE. For example, session control signalling typically involve setting up and configuring data bearers that are used for the communication of user plane data. Hence, the cellular communications network 100 may also comprise a Mobility Management Entity (MME) 240, known from e.g. LTE, that communicates with the eNBs, here base stations 110 and 111, and the Serving Gateway 143. The MME 240 may be regarded as main responsible for the session control signalling and setting up and configuring of data bearers for user plane traffic to and from the user equipments 120-123. This is also the case for MBMS related traffic for LTE, but where the MME 240, as shown, communicates with the MBMS GW 162 instead of the Serving Gateway 143. In case of data bearers that are MBMS related, the MME 240 may not communicate directly with the eNBs, here base stations 110, 111, but via a Multi-cell/multicast Coordination Entity (MCE) 244, as shown in FIG. 2. The MME 240 is a logical unit, which may be implemented in a corresponding physical unit, or together with other logical units or functionality in one or more shared physical units. The MME 240 is a network node in the cellular communications network 100, or more particularly, as shown, in the EPC network 101 thereof. The MCE 244 is also a logical unit, which may be implemented in a corresponding physical unit, or together with other logical units or functionality in one or more shared physical units. For example, there may be one MME 244 that corresponds to a physical unit communicatively connected to several base stations, such as with base stations 110, 111, as shown in FIG. 2, or there may be several MMEs, a respective one for and integrated with each base station.

Session control signaling for embodiments herein when implemented in an LTE and eMBMS based cellular communications network 100, as shown in FIG. 1 and FIG. 2, may follow normal procedures and will therefore not be discussed in any further detail in the following. For example, how the BMSC 161 has been configured and what digital content to broadcast or multicast, does not affect the procedures for the session control signaling as such. The skilled person with knowledge of LTE and eMBMS will realize what session control signaling will be involved and may be needed for implementation of embodiments herein.

When the digital content is provided by broadcast or multicast instead of unicast, the result is that one and the same copy of the digital content may be received by multiple user equipments at the same time, instead of sending and addressing a separate copy of the digital content to each one of multiple user equipments, e.g. each one of the user equipments 120-123, as in the case of unicast. Hence multiple unicast downlink transmissions, e.g. one for each one of individual user equipments, where each unicast transmission would require a certain bandwidth, are possible to replace by broadcast or multicast with a bandwidth that is independent on the number of receiving user equipments. This may be used to reduce the risk of capacity overload in the cell or cells subject to the broadcast or multicast. However, this does not happen automatically just because e.g an LTE based cellular communications network is supporting eMBMS. For example, not all digital content may be subject for broadcast or multicast so there must be a decision of what to broadcast or multicast, and also when and where to do it. Another issue is how to get a user equipment to receive and utilize the digital content. This will be dealt with in the following, in context of embodiments herein.

However, first it is again reminded that FIG. 1 and FIG. 2 are only schematic and for exemplifying purpose. The cellular communications network 100 may in reality comprise several further cells, base stations, user equipments, and other network nodes, including management entities, which are not shown herein. Hence, the situation shown in FIG. 1 and FIG. 2 and discussed above, is not in every detail a prerequisite for embodiments herein, as should be understood by the skilled person, and in particular when considering the present application as a whole. For example, FIG. 1 only shows one service area, while embodiments herein are relevant also when the cellular communications network 100 comprises several service areas, for example a respective service area for each population dense area, such as city area, with an expected or known high utilization degree of the capacity provided by the cells of the cellular communications network 100 in that area. Also, in FIG. 1 and FIG. 2 it is only shown two cells 115, 116 in the shown service area 105, however, in some embodiments there may be one or more service areas comprising only a single cell, i.e. the service area 105 may correspond to a single cell, although a more typical situation is that the service area 105 comprises say at least ten, hundreds or even thousand cells, for example every cell in a large city.

Examples of embodiments herein relating to a method in the Broadcast Management unit 163 for recommending and providing digital content to the first user equipment 120, will now be described with reference to the combined signaling diagram and flowchart depicted in FIG. 3. The actions may be taken in any suitable order.

Action 301

The Broadcast Management unit 163 decides to recommend a digital content to the first user equipment 120 and one or more additional user equipments 121, 122, 123, and to provide the digital content by broadcast or multicast in the service area 105 comprising the cell 115.

The digital content is typically data from the internet, e.g. available on the World Wide Web (WWW), often referred to as web content, but may also be other kind of digital content. For example, digital content may relate to a web radio transmission for reception by an application running on the first user equipment 120, a video clip for view on the first user equipment 120, a web-page for execution and display using a web-browser executing on the first user equipment 120, any application specific digital content, a downloadable new firmware or application for execution on the first user equipment 120, just to mention some examples. The digital content may correspond to a single data file or a group of data files. The digital content may be live and/or streamed digital content. The digital content may correspond to digital content available on the Internet and that normally is only available to the first user equipment 120 by unicast.

The deciding may be based on one or more measures and/or parameters, which will be discussed separately below.

Action 302

The Broadcast Management unit 163 sends, in response to the decision in Action 301, a configuration for configuring the BMSC 161 to accomplish the broadcast or multicast according to the decision.

The configuration may e.g. comprise one or more of the following: an identifier of the digital content so that the BMSC 161 is able to fetch and use the digital content for the broadcast or multicast, an identifier of the cell or cells, e.g. the cell 115, where the broadcast or multicast is to be provided, a bandwidth and/or bandwidth limits to be used for the broadcast or multicast, information about when to start and/or when to stop the broadcast or multicast of the digital content, information to be comprised in the Service Announcement (see e.g. Action 305 below), information to be used for tagging the digital content (see e.g. Action 304 below).

The identifier of the digital content may refer to digital content provided from the one or more support units 164 discussed above, e.g. the content providing unit or the data carousel providing unit, or may be an identifier referring to content available elsewhere, e.g. in the external network 150, such as the Internet. An identifier of the service area 105 may be regarded an identifier of the cell 115 when it is known that the cell 115 is comprised in the service area 105. In some embodiments the cell 115 may be predetermined for the broadcast or multicast and thereby may be already known to the BMSC 161 and thus no identifier of the cell 115 need to be comprised in the configuration. This may e.g. be the case for embodiments where the BMSC 161 is configured to serve one and the same, or even is associated with only one, service area in the cellular communications network 100.

In some embodiments, support for providing the broadcast or multicast is provided by the one or more support units 164. In embodiments with one or more support units 164, the BMSC 161 may use the received configuration to configure and/or instruct one or more of the support units to provide the support. In some embodiments, the configuration may be sent by the Broadcast Management unit 163 to one or more of the support units 164 that may forward it to the BMSC 161 or may use it to further configure and/or instruct the BMSC and/or one or more other support units.

In some embodiments there may be several configurations and/or instructions sent by the Broadcast Management unit 163. One or more of said several configurations and/or instructions may be sent to respective one or more support units 164 to make the one or more support units 164 provide the support. For example, the decision by the Broadcast Management unit 163 to provide the digital content by broadcast or multicast in the service area 105 may in some embodiments be followed by that the Broadcast Management unit 163, in response thereto, sends a configuration to the scheduling unit comprised in the one or more support units 164. The scheduling unit may then, in response, schedule the broadcast or multicast. The scheduling unit may then, in accordance with the schedule, initiate the broadcast or multicast directly with the BMSC 161, via the Broadcast Management unit 163 or via the data carousel unit also comprised in the one or more support units 164. When the data carousel unit is involved, the data carousel unit may fetch the digital content from or via the content providing unit, also comprised in the one or more support units 164, and may then provide a data carousel comprising the digital content to the BMSC 161 for accomplishing the broadcast or the multicast. The BMSC 161 may fetch the digital content for the broadcast or multicast from or via the content providing unit, e.g. such digital content that is not first to be arranged in a data carousel by the data carousel unit.

Action 303

The BMSC 161 fetches the digital content for the broadcast or multicast in response to received configuration. The BMSC 161 may fetch the digital content from the external network 150, e.g. the Internet, via the PDN Gateway 142, or the digital content may be fetched from within the cellular communications network 100. In some embodiments it is fetched from or via the content providing unit comprised in the one or more support units 164, discussed above. Note that even in a case when the BMSC 161, in response to the received configuration, fetches the digital content from the external network 150 instead from an internal storage of e.g. the content providing unit as discussed above, the fetched digital content may still be stored temporarily in an internal storage, e.g. located in the BMSC 161 or in the data carousel unit as discussed above, until it is time to use the digital content to provide the broadcast or multicast, e.g. by adding the digital content to a data carousel subject to the broadcast or multicast.

Action 304

The BMSC 161 sends the fetched digital content, via the MBMS GW 162, to the base station 110 that receives the digital content and broadcast or multicast the received digital content in the cell 115.

In some embodiments an identifier of recommended content may be added to and/or associated with the digital content, e.g. the above-mentioned MBMS packets comprising the digital content, which packages are sent by the BMSC 161. In some embodiments the identifier of recommended content may be comprised in the Service Announcement, see Action 305 below. The identifier of recommended content enables the first user equipment 120 to identify the digital content, among other digital content in the provided broadcast or multicast, as such digital content that has been decided to be recommended. The identifier may be unnecessary and may be excluded, e.g. in embodiments where all digital content in the provided broadcast or multicast is digital content that has been decided to be recommended.

In some embodiments the digital content may be tagged in the provided broadcast or multicast, such that the first user equipment 120, based on the tagged digital content and a user profile of, or setting in, the first user equipment 120, is able to determine that the digital content is relevant to be recommended on the first user equipment 120 and thereby may be relevant for receiving and/or keeping. The tagging may be made for one or more profile groups of user equipments for which profile groups the digital content is relevant to be recommended, wherein each profile group comprises user equipments that are associated with similar user profiles and/or settings. Each such profile group may e.g. comprise one or more of the user equipments 120-123. The tagging may be added in the BMSC 161 based on the type of digital content and/or according to information provided in the configuration. In some embodiments, the tagging may be accomplished by a tag that may be added to and/or associated with the MBMS packages comprising the digital content, which packages are sent by the BMSC 161. The tag may e.g. correspond to a value or text with a predetermined meaning. In some embodiments the tag may be comprised in the Service Announcement, see Action 305 below. The tagging and the tag may be unnecessary and may be excluded, e.g. in embodiments where all digital content to be recommended is to be recommended on all user equipments in the service area 105, e.g. all user equipments 120-123.

Execution of the present action thus makes the digital content available to all user equipments being served in the cell 115, including user equipments 120 and 121, (if broadcast) or available to multiple, but not necessarily all user equipments in the cell 115 (if multicast). In the latter case, the multicast may e.g. include the first user equipment 120 and exclude the second user equipment 121. However, note that availability of digital content to a user equipment does not necessarily mean that that the digital content is relevant to be recommended on that user equipment.

Action 305

The BMSC 161 sends a Service Announcement, via the MBMS GW 162, to the base station 110 that receives the Service Announcement and provide broadcast or multicast of the received Service Announcement in the cell 115.

The Service Announcement identifies the digital content and the availability of the digital content in the provided broadcast or multicast. The Service Announcement comprises information to user equipments, such as the first user equipment 120, about what digital content is available by the broadcast or multicast.

In some embodiments, as mentioned above for Action 304, the identifier of recommended content may be comprised in the Service Announcement. The identifier may be added in association with a description of the digital content in the Service Announcement.

In some embodiments, as mentioned above for Action 304, the tag is comprised in the Service Announcement. The tag may be added in association with a description of the digital content in the Service Announcement.

The Service Announcement may be provided as a service layer function by the BMSC 161. One purpose of the Service Announcement is to enable overview of the digital content being provided by the broadcast or multicast without having to first download the actual digital content. The Service Announcement may thus e.g. enable faster knowledge and evaluation of the available digital content by the user equipments, e.g. the first user equipment 120.

The Service Announcement is typically, but not necessarily, comprised in a data carousel, which may be referred to as a Service Announcement carousel. In some embodiments with a Service Announcement it may e.g. be received via unicast. In e.g. eMBMS, discussed in the foregoing, the Service Announcement carousel may repeat sending Metadata Fragments at predetermined intervals, see e.g. ETSI TS 126 346 V9.7.0 (2012-07): Universal Mobile Telecommunications System (UMTS); LTE; Multimedia Broadcast/Multicast Service (MBMS); Protocols and codecs (3GPP TS 26.346 version 9.7.0 Release 9), Section 5.2 User Service Discovery/Announcement.

The Service Announcement carousel may be provided to the BMSC 161 by the one or more support units 164. The creation and insertion of Service Announcements in the broadcast or multicast may be arranged to follow automatically based on the digital content that is actually being provided by the broadcast or multicast, which is information that may be present in and taken from e.g. the BMSC 161, the Broadcast Management unit 163 and/or the one or more support units 164.

Hence, when a Service Announcement is present, it may suffice that the first user equipment 120 is able to receive and read the Service Announcement to be able to find and download the digital content that is provided by the broadcast or multicast in the cell 115 and may thereby receive information for finding and identifying the digital content that is recommended. The Service Announcement may be transmitted using an MBMS bearer that is default available to user equipments in the service area 105 where the broadcast or multicast is provided, e.g. to the first user equipment 120. For example, in LTE and eMBMS, information where to find the Service Announcement may be transmitted in a Multicast Control Channel (MCCH) that is listened to by every user equipment entering a service area where broadcast or multicast is provided.

However, note that in some embodiments there may be no Service Announcement. An example of this will be given below in connection with FIG. 4.

Action 306

The first user equipment 120 registers, within the first user equipment 120, a request for one or more digital contents that are recommended. This may e.g. happen at any point in time when the digital content is being provided by the broadcast or the multicast in the cell 115 and the Service Announcement may be available, according to the previous actions. However, the request being registered need not be dependent on when or even if the digital content is actually available by the broadcast or multicast. The request may be result from a user generated action, e.g. start of an application for recommending digital content or a user selection in such an application when it is executing on the first user equipment 120. The request being registered may also follow from an automatically triggered event on the user equipment, e.g. at a predetermined point in time or following release of some trigger that e.g. new digital content that is recommended is available from broadcast or multicast. Such trigger may e.g. be received by unicast through an application, e.g. said application for recommending digital content. The application for recommending digital content, or any software for recommending digital content that may generate the request for the digital content that is recommended, may be fully or partly integrated with an operating system of the first user equipment 120.

Action 307

The first user equipment 120 receives the Service Announcement in response to the registered request. Purpose, how and where the first user equipment 120 may find the Service Announcement and information that may be comprised in the Service Announcement, was discussed above, see e.g. Action 304 and Action 305.

Action 308

The first user equipment 120 checks the received Service Announcement for one or more digital contents that are recommended. The user equipment may check the Service Announcement for one or more identifiers of recommended content and/or one or more tags as discussed above for Action 304 and Action 305. This may be done in order to be able to identify digital content that is recommended and available in the provided broadcast or multicast and/or be able to identify digital content relevant to be recommended on the first user equipment 120. It is here and below assumed that a digital content that is recommended is found in the Service Announcement and that the found digital content is relevant to be recommended on the first user equipment 120. The first user equipment 120 may, based on information in the Service Announcement, be enabled to receive the digital content that is recommended from the provided broadcast or multicast.

Action 309

The first user equipment 120 displays a representation of the digital content that is recommended, which representation is selectable, e.g. selectable by a user of the first user equipment 120, for access to the digital content. The representation may e.g. graphical and/or textual objects illustrating and/or describing the type or actual content of the digital content. For example, the user of the first user equipment 120 may select the representation with purpose to access and take part of the digital content, e.g. view a news video clip, listen to a web radio transmission, access a webpage, download an application or update a software, just to give some examples.

Action 310

The first user equipment 120 receives the digital content that is recommended from the provided broadcast or multicast, in response to that the representation of the digital content has been selected, e.g. in response to that the user of the first user equipment 120 has found the recommendation to be of interest.

After or during receipt, the digital content may be accessed by and presented on the first user equipment 120 and may thereby be enjoyed by the user, e.g. through an application executing on the first user equipment 120 and that is dedicated for accessing the digital content. For example, a web browser application may be used for accessing to digital content that corresponds to a web page, a video viewing application for accessing a video clip, just to mention some few examples.

Figure 4:
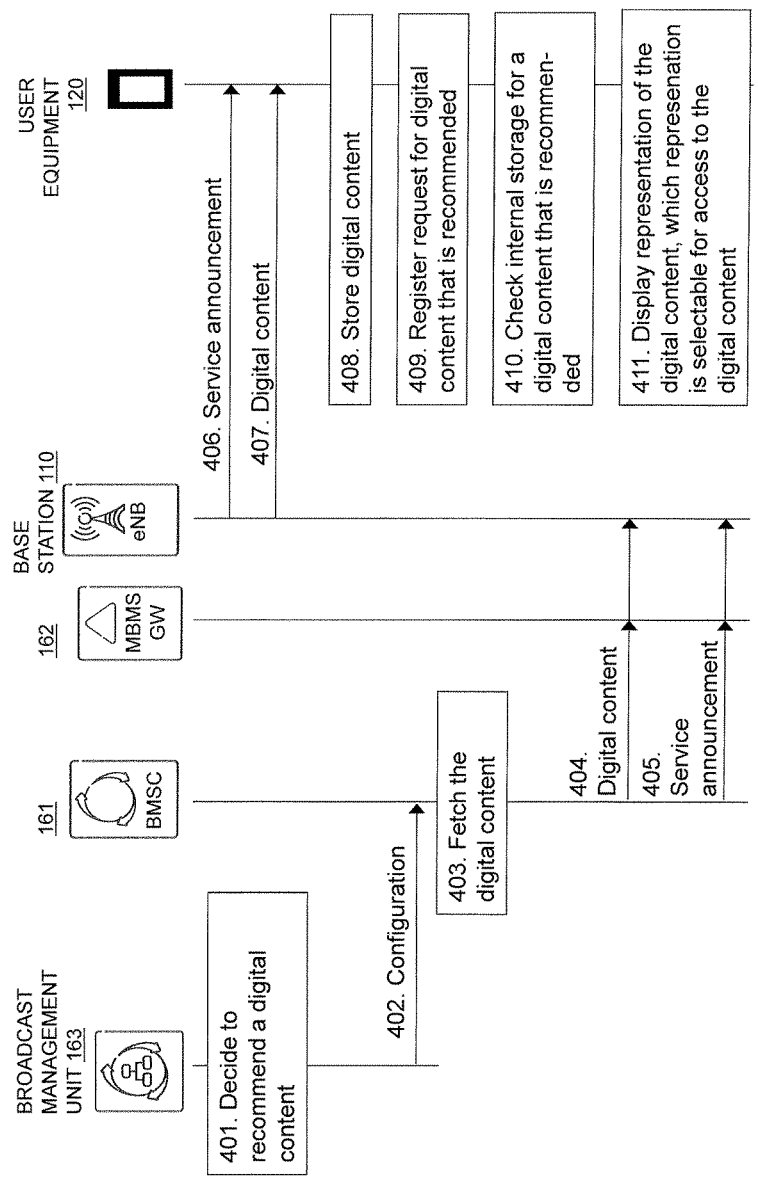
FIG. 4 is another combined signalling diagram and flowchart for illustrating examples of embodiments herein.

Examples of embodiments herein relating to a method in the Broadcast management unit 163 for recommending and providing digital content to the first user equipment 120, will now be further described with reference to the combined signaling diagram and flowchart depicted in FIG. 4.

Figure 3:
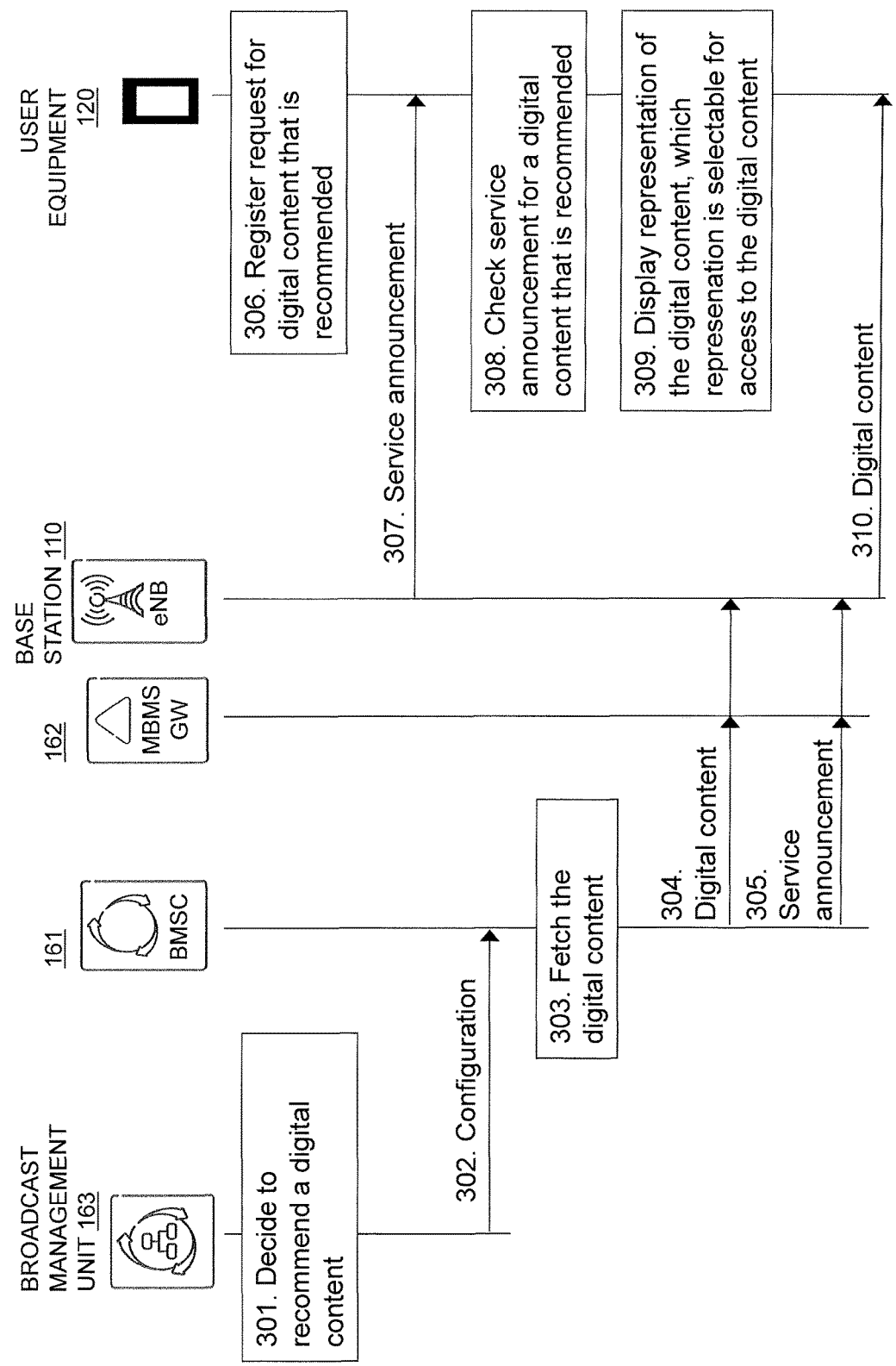
FIG. 3 is a combined signalling diagram and flowchart for illustrating examples of embodiments herein.

As may be noted, the difference compared to the combined signaling diagram and flowchart depicted in FIG. 3 and discussed above, is relating to the first user equipment 120. Actions 401-405 may correspond to Action 301-305 described above and will therefore not be further described here. The actions may be taken in any suitable order.

Action 406

The first user equipment 120 receives the Service Announcement from the base station 110. The user equipment may be configured to receive the Service Announcement automatically, e.g. repeatedly or when in an idle state or in a situation when the first user equipment 120 has spare capacity for doing so. This enables the first user equipment 120 to identify changes in digital content being provided by broadcast or multicast. How and where the first user equipment 120 may find the Service Announcement was discussed above under Action 305.

Action 407

The first user equipment 120 receives the digital content from the provided broadcast or multicast, e.g. in response to that the first user equipment 120 has found where to find the digital content based on the received Service Announcement. In general the first user equipment 120 may only receive digital content that not previously has been received and/or stored, e.g. receive digital content when a change in the provided digital content has been identified in the Service Announcement and which change indicate new digital content that may be relevant for the first user equipment 120. For further comments in this regard, see Action 408.

In some embodiments, the first user equipment 120 may check the received Service Announcement for one or more digital contents that are recommended. The user equipment may check the Service Announcement for one or more identifiers of recommended content and/or one or more tags as discussed above for Action 304 and Action 305. This may be done in order to be able to identify and only receive digital content that is recommended and/or be able to identify and then only receive digital content relevant to be recommended on the first user equipment 120. This way it can be avoided to receive digital content that is not recommended and/or be avoided to receive digital content that is not relevant to be recommended on the first user equipment 120.

Action 408

The first user equipment 120 stores the received digital content in an internal storage on the first user equipment 120. The first user equipment 120 may be configured to receive and/or store one or more digital content that according to the Service Announcement are available in the provided broadcast or multicast and not previously have been stored, and thereby already are available, in the internal storage of the first user equipment 120.

In some embodiments the first user equipment 120 may be configured to only store digital content that fulfill certain criteria and that not previously has been stored in and already is available in the internal storage on the first user equipment 120, i.e. a subset of available digital content in the provided broadcast or multicast. For example, in some embodiments, e.g. as a result from what was discussed above under Action 304 and Action 305, the received digital content may be tagged and the storing, i.e. storage in the internal storage, may only be made after it has first been determined that that the digital content is relevant to be recommended on the first user equipment 120 based on the digital content that is tagged and a user profile of, and/or setting in, the first user equipment 120. For example, as mentioned above, the digital content may be tagged for one or more profile groups of user equipments for which the digital content is relevant, wherein each profile group comprises user equipments that are associated with similar user profiles and/or settings, e.g. one or more or user equipments 120-123. The first user equipment 120 may thus, based on a user profile or setting of its own that is available on the first user equipment 120, determine that the digital content is relevant to be recommended on the first user equipment 120 and based on this store it in the internal storage.

Action 409

The first user equipment 120 registers, within the first user equipment 120, a request for one or more digital contents that are recommended. This action may correspond to Action 306 above and is therefore not further discussed here.

Action 410

In response to the registered request, the first user equipment 120 checks the internal storage for one or more digital contents that are recommended. In some embodiments, the first user equipment 120 may check the internal storage for one or more identifiers of recommended content and/or one or more tags as discussed above for Action 304 and Action 305. It is here and below assumed that a digital content that is recommended is found in the Service Announcement and that the found digital content is relevant to be recommended on the first user equipment 120.

Action 411

The first user equipment 120 displays, in response to that the digital content that is recommended was found in Action 410, a representation of the digital content, which representation is selectable for access to the digital content. The present action may correspond to Action 309 above, and as already mentioned, the representation may e.g. graphical and/or textual objects illustrating and/or describing the type or actual content of the digital content. For example, a user of the first user equipment 120 may select the representation with purpose to access and take part of the digital content, e.g. view a news video clip, access a webpage, download an application or update a software, just to give some examples.

When the representation of the digital content that is recommended is selected, the digital content that is recommended may be received from the internal storage and presented to the user, e.g. through an application that is dedicated for accessing the digital content. For example, a web browser application may be used for accessing and presenting digital content that corresponds to a web page, a video viewing application for accessing a video clip, just to mention some few examples.

In some embodiments with storage in the internal storage as discussed above, there may not be used a Service Announcement or similar message. For example, instead of being directed to the broadcast or multicast of the Service Announcement when entering the cell 115 as discussed above under Action 305, the first user equipment 120 may instead be directly directed to a broadcast or multicast of digital content from which the first user equipment 120 may store the digital content in the internal storage as discussed above under Action 408, and then proceed as discussed above under Actions 409-411.

By recommending digital content, make it available from broadcast or multicast and displaying the representation of the recommended digital content, as discussed above in connection with FIG. 3 and FIG. 4, users will be inspired to access the digital content that is recommended and displayed, which will reduce the demand for same or corresponding digital content by unicast and thereby also reduce the risk of capacity overload in the service area 105, and in the cell 115 where the first user equipment 120 is served. The broadcast or multicast also enables delivery of the digital content to each receiving user equipment at higher speed and/or better quality of service than if the digital content was to be delivered by multiple unicast transmissions.

In some embodiments, the provided broadcast or multicast in the service area 105 may use cell capacity that else would be unused, which may be referred to as spare capacity. It may be particularly advantageous to use spare capacity for the embodiments discussed above in connection with FIG. 4, i.e. embodiments with storage of the digital content that is recommended before the user has selected the displayed representation, or even before there has been any displaying of the representation. By using cell capacity that else would be unused, implementation may carried out in an existing cellular communications network with reduced risk of negative influence on already supported services. The cell capacity that else would be unused may be based on statistics and/or on feedback regarding capacity utilization from base stations serving cells in the service area 105, e.g. base stations 110, 111 serving cells 115, 116. It may e.g. be advantageous to provide the broadcast or multicast overnight when there typically is spare capacity available. In some embodiments, use of cell capacity that else would be unused may involve distributing provision of the broadcast or multicast in time, e.g. provide the broadcast or multicast at different points in time for different cells in the service area 105, e.g. so that the broadcast or multicast of the digital content in a longer run, e.g. during a one day, will still be provided to all or at least a large amount of all cells. e.g. cells 115, 116, in the service area 105.

As mentioned above, see e.g. Action 301, the Broadcast Management unit 163 may decide to recommend the digital content by broadcast or multicast in the service area 105 based on one or more measures and/or parameters. These will now be discussed and exemplified, and examples will be given how measures and/or parameters may be combined for taking the decision.

One measure may be based on feedback regarding the digital content from user equipments that have already recommended the digital content. The feedback may e.g. be based on access to the digital content by these user equipments, e.g. resulting from user selection of the representation of the digital content. In some embodiments the feedback may be based on voting by users that have selected the representation of the digital content, e.g. through a provided voting functionality associated with the digital content, e.g. comprised in an application responsible for display of the representation. The feedback may be retrieved through functionality in the application responsible for display of the representation and may be sent using conventional unicast traffic from the first user equipment 120 to the base station 110, and further via the Serving Gateway 143, the PDN Gateway 142 and eventually be available to the Broadcast Management unit 163. Use of feedback when making the decision may be very powerful since it enables to repeatedly take new and improved decisions of what digital content to keep and/or replace as recommendations, so as to increase the number of users actually finding the recommendations sufficiently interesting to be accessed. The more users that will access the digital content that is recommended, the better, since it reduces the demand for same or corresponding digital content by unicast even more and thereby also further reduce the risk of capacity overload in the service area 105, and in the cell 115.

Another measure that may be used is how many times the digital content has been requested by user equipments, e.g. including one or more of user equipments 120, 121, 122, 123, in e.g. the cellular communications network 100 in general, or in the service area 105 in particular. This would typically include conventional requests through unicast. If many users without recommendation are interested in a certain digital content, it is likely that many additional users would be interested in it if they become aware by recommendation. Providing the measure may involve monitoring traffic from the PDN Gateway 142 to the external network 150, and make the resulting measure available to the Broadcast Management unit 163. In some embodiments only a randomly or in some other way selected sub-group of user equipments in the cellular communications network 100 or in the service area 105 may be used to produce the measure. How many times the digital content has been requested may comprise how many times in a recent time period, such as the last hour, the digital content has been requested.

Yet another measure that may be used is how many user equipments, such as user equipments 120, 121, 122, 123, e.g. in the cellular communications network 100 in general, or in the service area 105 in particular, are relevant for recommendation of the digital content. The measure of how many user equipments are relevant for recommendation of the digital content may be based on one or more of:

User profiles and/or user settings associated with said user equipments.

Positions of said user equipments.

Movement patterns of said user equipments.

Availability of new content to said user equipments.

Similarity between a present situation and a historical situation.

The items of this list will now be described in some further detail.

Respective user profile or profiles, and/or setting or settings, of each of said user equipments, or at least some of said user equipments, may be available to the Broadcast Management unit 163 in response to that e.g. a respective user of each user equipment, e.g. first user equipment 120, has made such available, e.g. by agreement with the operator of the cellular communications network 100, such as in connection with registering or activating the first user equipment 120 in the cellular communications network 100. The first user equipment 120 may e.g. have a user profile or setting associated therewith that is indicating that the first user equipment 120 is relevant for software updates of installed system software and/or applications, or is interested in receiving live news. The first user equipment 120 may then count as relevant for digital content relating to this.

Positions of user equipments in the cellular communications network 100, including e.g. the first user equipment 120, are typically available in the cellular communications network 100 and may thus be made available to the Broadcast Management unit 163, at least with the resolution of which cell a particular user equipment is being located, but often also with higher resolution. The first user equipment 120 may also itself locate its position, e.g. by means of a built in GPS-receiver and report it for availability in the cellular communications network 100 and the Broadcast Management unit. Many user equipments with e.g. a user profile or setting that makes them relevant for recommendation of the same digital content and that are located in the service area 105, may result in a decision to provide the digital content by broadcast or multicast in the service area 105. Another example is a large amount of user equipments being located in a particular cell, e.g. cell 115, in the service area 105, which thereby may increase the risk for capacity overload if digital content is provided by unicast. By deciding to recommend digital content that is targeted towards the user equipments in such cell, there risk of capacity overload in the cell may be reduced.

Movement patterns of user equipments in the cellular communications network 100, e.g. including one or more of user equipments 120-124, may be determined by keeping track of change in the positions of these user equipments, e.g. the user equipments 120-123. For example may user equipments with a movement pattern towards the service area 105 be used to proactively take decision of what digital content to recommend and provide by broadcast or multicast in the service area 105. If there among the user equipments moving towards the service area 105 is a large amount of user equipments whose user profiles and/or settings are indicating a common interest in certain digital content, this may contribute to a decision to recommend and provide such digital content by broadcast or multicast in the service area even before the user equipments have reached the service area 105.

Availability of new content to the user equipments in the cellular communications network 100, e.g. to one or more of user equipments 120-123. The availability of digital content may e.g. be a new version of an installed application or new system software for download/installation. If it is known, or can be assumed, that many of the user equipments in the service area 105 may be interested in downloading such digital content as soon as or in close connection with it being available, this is a good reason for taking decision to recommend and provide it by broadcast or multicast in the service area 105.

Similarity between a present situation and a historical situation is also a measure that may be used, e.g. by comparing one or more of the above discussed measures in a present situation with a situation in the past that was similar in some regard and/or that resulted in a certain decision or demand. If the similar situation in the past resulted in a great demand for certain digital content and/or made, or would have made, it beneficial to provide certain digital content by broadcast or multicast, this may be a contributing factor when taking a present decision of what digital content to recommend and provide by broadcast or multicast in the service area 105.

Further measures and/or parameters that may be used for taking the decision to provide digital content by broadcast or multicast in the service area 105 may include one or more of the following:

A minimum number of user equipments, including e.g. first user equipment 120, for which the digital content is relevant to be recommended for there to be expected a gain in resource utilization in the service area 105 by recommending and providing the digital content by the broadcast or the multicast.

A data type associated with the digital content. For example, it may be decided to only recommend digital content of certain data types that are particularly known to contribute to overload in cell capacity, e.g. digital content relating to software download and/or live video and/or audio streaming.

A size of the digital content. For example, only digital content above a certain size may be decided to be recommended and provided by the broadcast or multicast.

A bandwidth requirement associated with the digital content. For example, only digital content associated with a certain minimum bandwidth may be decided to be recommended and provided by the broadcast or multicast.

A lifetime of the digital content. For example, if some digital content is known to only be available a very short time, this may affect the decision. Since user response to a recommendation may be expected to involve some delay, short life time may contribute to taking a decision not to recommend and provide the digital content by the broadcast or multicast, and correspondingly may a long life contribute to a decision to recommend the digital content by the broadcast or multicast, at least during a time period of the life time when interest of the digital content is expected to be high.

It is understood that the above discussed measures and parameters, although may be used alone or only a few thereof in combination, enable great many various combinations but that it is not possible to discuss every combination in detail herein.

Figure 5:
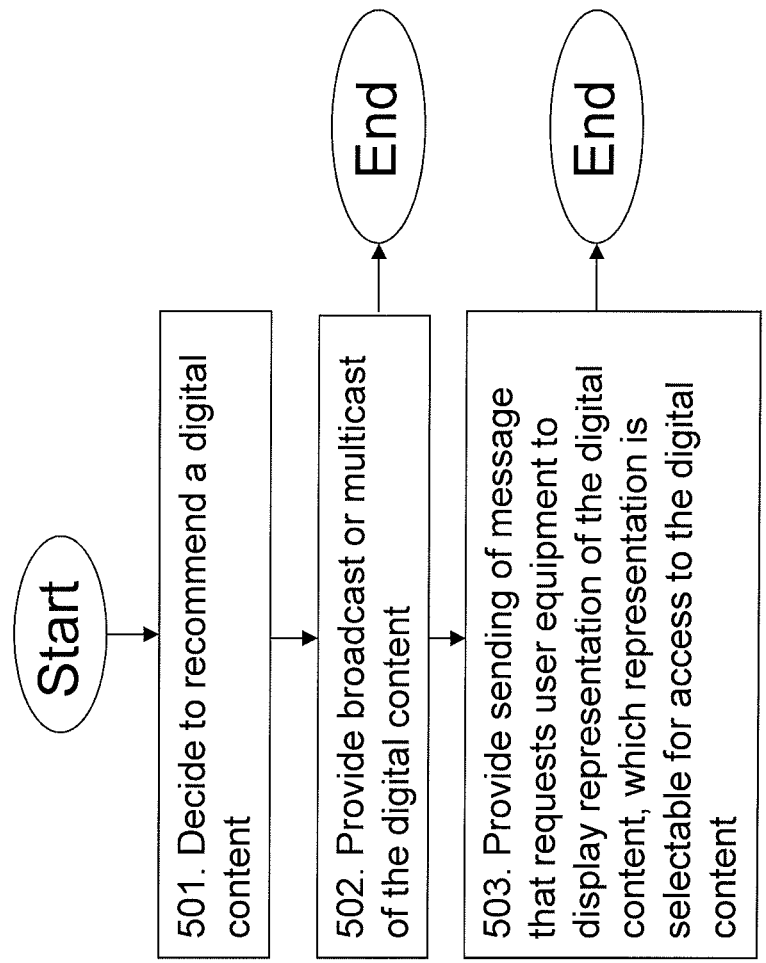
FIG. 5 is a flow chart illustrating a method in a Broadcast Management unit according to embodiments herein.

Embodiments herein relating to a method in the Broadcast management unit 163 for recommending and providing digital content to the first user equipment 120, will now be further elaborated and described with reference to the flowchart depicted in FIG. 5. The first user equipment 120 is served by the base station 110 in the cellular communications network 100. The base station 110 is comprised in the radio access network 102 of the cellular communications network 100 and the Broadcast Management unit 163 is comprised in the core network 101 of the cellular communications network 100. The method comprises the following actions, which actions may be taken in any suitable order. Further, actions may be combined.

Action 501

The Broadcast Management unit 163 decides to recommend a digital content to the first user equipment 120 and one or more additional user equipments, e.g. user equipments 121-123.

In some embodiments the decision is based on feedback regarding the digital content from user equipments that have already recommended the digital content by displaying a representation of the digital content, which representation is selectable for access to the digital content.

In some embodiments, the decision may be based on a measure associated with how many times the digital content has been requested by user equipments, e.g. user equipments 120, 121, 122, 123, in the cellular communications network 100.

Further, in some embodiments, the decision may be based on a measure associated with how many user equipments, e.g. user equipments 120, 121, 122, 123, that are relevant for recommendation of the digital content.

In some embodiments, the measure associated with how many user equipments that are relevant for recommendation of the digital content may be based on one or more of:

User profiles and/or user settings associated with user equipments, e.g. user equipments 120, 121, 122, 123, in the cellular communications network 100.

Positions of user equipments, e.g. user equipments 120, 121, 122, 123, in the cellular communications network 100.

Movement patterns of user equipments, e.g. user equipments 120, 121, 122, 123, in the cellular communications network 100.

Availability of new content to user equipments, e.g. user equipments 120, 121, 122, 123, in the cellular communications network 100.

Similarity between a present situation and a historical situation.

Moreover, in some embodiments the decision may be based on one or more of the following:

A minimum number of user equipments, e.g. user equipments 120, 121, 122, 123, for receiving the digital content at the same time in the service area 105 in order for there to be a gain in resource utilization in the service area 105 by providing the digital content by the broadcast or the multicast instead of only letting the digital content be available by unicast.

A data type associated with the digital content.

A size of the digital content.

A bandwidth requirement associated with the digital content.

A lifetime of the digital content.

This action may correspond fully or partially to the previously described Action 301 and Action 401.

Action 502

The Broadcast Management unit 163 provides, in response to the decision, broadcast or multicast of the digital content in the service area 105. This enables reception of the digital content by the first user equipment 120 via the base station 120 and by said one or more additional user equipments, e.g. user equipments 121, 122, 123, in the service area 105.

In some embodiments, the provided broadcast or multicast in the service area 105 uses cell capacity that else would be unused.

This action may correspond fully or partially to the previously described Actions 302-304 and Actions 402-404.

Action 503

This is an optional action for embodiments herein. The Broadcast Management unit 163 provides a sending of a message from the base station 110 to the first user equipment 120. The message requests the first user equipment 120 to display a representation of the digital content, which representation is selectable for access to the digital content. The request may explicit but is typically implicit. An implicit request may be accomplished by any message sent to the user equipment and that causes the user equipment to display the representation.

In some embodiments the message may correspond to or comprise an identifier that enables the first user equipment 120 to identify the digital content, among other digital content that is provided by broadcast or multicast, as such digital content that has been decided to be recommended.

Further, in some embodiments the message may correspond to or comprise a 30 tag that is unique for one or more profile groups of user equipments, for which profile groups the digital content is relevant to be recommended, wherein each profile group comprises user equipments that are associated with similar user profiles and/or settings.

Moreover, in some embodiments, the message may correspond to comprise a service announcement that identifies the digital content and the availability of the digital content in the provided broadcast or multicast. The service announcement may be comprised in a data carousel that is provided by broadcast or multicast in the service area 105.

In some embodiments, where all digital content that is provided by broadcast or multicast is such that is recommended, the message may correspond to the digital content as such.

This action may correspond fully or partially to the previously described Actions 302-305 and Actions 402-405.

Figure 6:
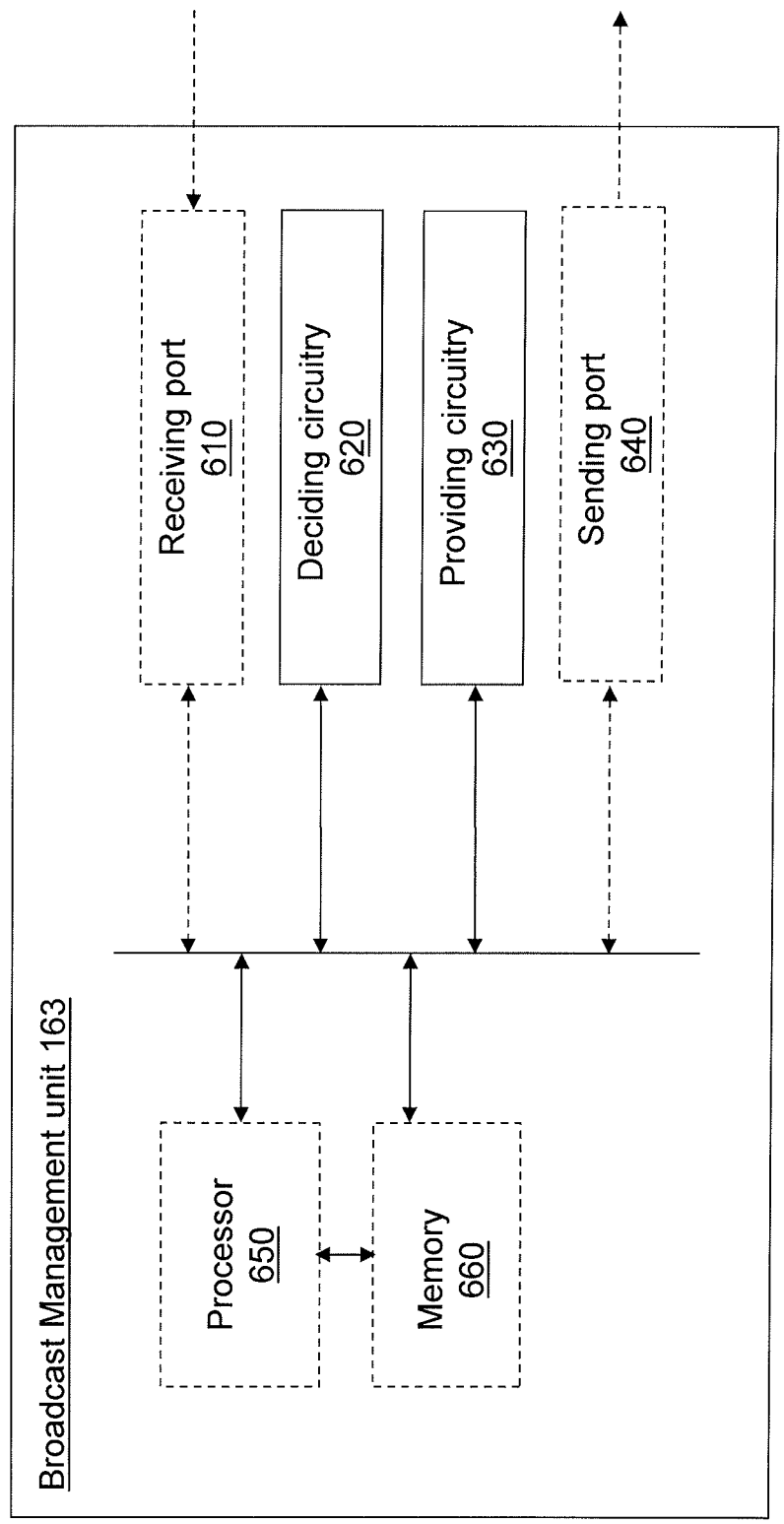
FIG. 6 is a schematic block diagram illustrating a Broadcast Management unit according to embodiments herein.

To perform the actions above for recommending and providing digital content to the first user equipment 120, the Broadcast Management unit 163 may comprise an arrangement schematically depicted in FIG. 6. As mentioned above, the first user equipment 120 is served by the base station 110 in the cellular communications network 100. The base station 110 is comprised in the radio access network 102 of the cellular communications network 100 and the Broadcast Management unit 163 is comprised in the core network 101 of the cellular communications network 100.

The Broadcast Management unit 163 comprises a deciding circuitry 620, configured to decide to recommend a digital content to the first user equipment 120 and one or more additional user equipments, e.g. the user equipments 121, 122, 123.

In some embodiments, the deciding circuitry 620 may be configured to make the decision based on feedback regarding the digital content from user equipments that have already recommended the digital content by displaying a representation of the digital content, which representation is selectable for access to the digital content.

Further, in some embodiments, the deciding circuitry 620 may be configured to make the decision based on a measure associated with how many times the digital content has been requested by user equipments, e.g. user equipments 120, 121, 122, 123, in the cellular communications network 100.

Moreover, in some embodiments, the deciding circuitry 620 may be configured to make the decision based on a measure associated with how many user equipments, e.g. user equipments 120, 121, 122, 123, that are relevant for recommendation of the digital content.

In some embodiments, the deciding circuitry 620 is further configured to make the decision based on one or more of the following:

The above-mentioned minimum number of user equipments, e.g. user equipments 120, 121, 122, 123, for which the digital content is relevant to be recommended for there to be expected a gain in resource utilization in the service area 105 by recommending and providing the digital content by the broadcast or the multicast.

A data type associated with the digital content.

A size of the digital content.

A bandwidth requirement associated with the digital content.

A lifetime of the digital content.

The Broadcast Management unit 163 further comprises a providing circuitry 630, configured to, in response to the decision, provide broadcast or multicast of the digital content in the service area 105, thereby enabling reception of the digital content by the user equipment 120 via the base station 110 and by said one or more additional user equipments, e.g. the user equipments 121, 122, 123, in the service area 105.

In some embodiments the providing circuitry 630 is further configured to provide the sending, e.g. via the sending port 640 discussed below, of the message from the base station 110 to the first user equipment 120, which message requests the first user equipment 120 to display the representation of the digital content, which representation is selectable for access to the digital content. As mentioned above, the message may i.a. comprise the service announcement that identifies the digital content and the availability of the digital content in the provided broadcast or multicast. In some embodiments, the service announcement is comprised in a data carousel and the providing circuitry 630 is 20 further configured to provide broadcast or multicast of the data carousel in the service area 105.

In some embodiments, the providing circuitry 630 is further configured to provide the broadcast or multicast in the service area 105 so that the broadcast or multicast uses cell capacity that else would be unused.

The Broadcast Management unit 163 may further comprise a receiving port 610 that may be configured to receive information from and be involved in communication with other units, e.g. the BMSC 161 and the one or more support units 164. For example may the receiving port 610 be configured to, from other parts of the cellular communications network 100, receive one or more of the aforementioned measures and/or parameters upon which the decision may be based.

The Broadcast Management unit 163 may further comprise a sending port 640 that may be configured to send information to and be involved in communication with other units, e.g. the BMSC 161 and the one or more support units 164. For example may the sending port 640 be configured to send aforementioned one or more configurations and/or instructions to the BMSC 161 and/or the one or more support units 164 in order to accomplish the broadcast or multicast in the service area 105.

The embodiments of the Broadcast Management unit 163 may be implemented through one or more processors, such as a processor 650 in the Broadcast Management unit 163 depicted in FIG. 6, together with computer program code for performing the functions and actions of embodiments herein. In some embodiments the circuitry discussed above may be fully or partially implemented by the processor 650.

The computer program code mentioned above may also be provided as a computer program product, for instance in the form of a data carrier carrying computer program code for performing the embodiments herein when being loaded into the in the Broadcast Management unit 163. One such carrier may be in the form of a CD or DVD. It is however feasible with other data carriers such as a memory stick, memory card or hard drive. The computer program code may furthermore be provided as pure program code on a server for download to the Broadcast Management unit 163. The computer program code may furthermore be provided in the form of a data file or files on, or available through, a server for download. The file or files may be executable files for direct or indirect download to and execution on the Broadcast Management unit 163, or may be for intermediate download and compilation to make them executable before download to and for execution in the Broadcast Management unit 163. The server may be accessible over a computer network, such as the Internet, and may e.g. be a web or ftp server.

The Broadcast Management unit 163 may further comprise a memory 660 comprising one or more memory units. The memory 660 is arranged to store data, such as values mentioned above relating to configuration/s and/or the instructions/s that may be sent to the BMSC 161 and/or the one or more support units 164, and/or to the measures and parameters for the decision, etc., and configurations and/or applications to perform the method when being executed in the Broadcast Management unit 163.

Those skilled in the art will also appreciate that the circuitry and ports 610-640 may refer to a combination of analog and digital circuits, and/or one or more processors configured with software and/or firmware (e.g., stored in memory) that, when executed by the one or more processors such as the processor 650, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
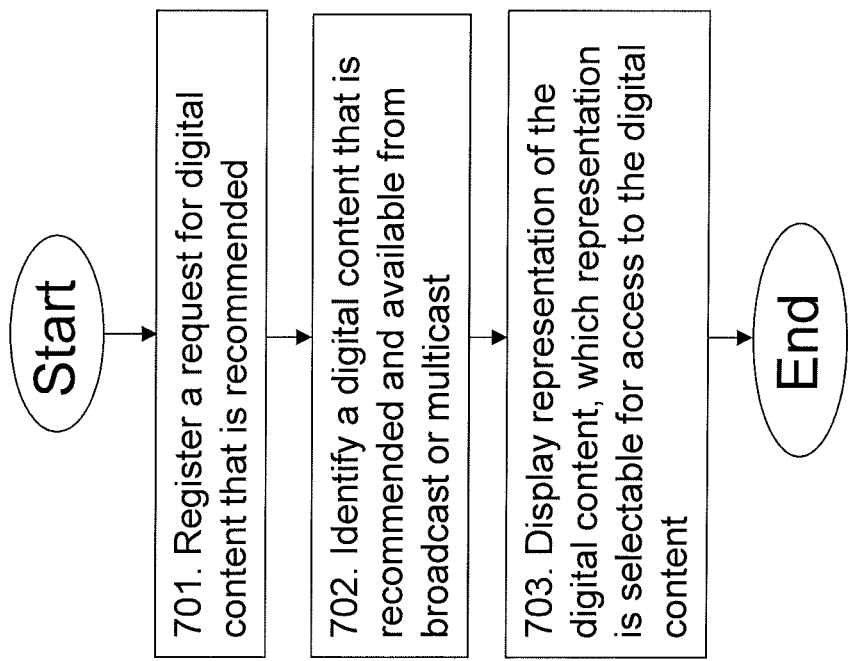
FIG. 7 is a flow chart illustrating a method in a user equipment according to embodiments herein.

Embodiments herein relating to a method in the first user equipment 120 for receiving digital content, will now be further elaborated and described with reference to the flowchart depicted in FIG. 7. The first user equipment 120 is served by the base station 110 in the cellular communications network 100.

The method comprises the following actions, which actions may be taken in any suitable order. Further, actions may be combined.

Action 701

The first user equipment 120 registers a request for one or more digital contents that are recommended.

This action may correspond fully or partially to the previously described Action 306 and Action 409.

Action 702

The first user equipment 120 identifies, in response to the registered request, a digital content that is recommended and available from broadcast or multicast by the base station 110.

In some embodiments, the present action comprises that the first user equipment 120 receives, from the base station 110, a message that requests the first user equipment 120 to display the representation. The message was explained in some further detail above in connection with Action 503.

In some embodiments, the message may comprise an identifier that enables the first user equipment 120 to identify the digital content, among other digital content in the provided broadcast or multicast, as such digital content that has been decided to be recommended.

Further, in some embodiments, the message may comprise a tag that is unique for one or more profile groups of user equipments for which profile groups the digital content is relevant to be recommended, wherein each profile group comprises user equipments that are associated with similar user profiles and/or settings.

Moreover, in some embodiments, the message may comprise a service announcement that identifies the digital content and the availability of the digital content in the provided broadcast or multicast. The service announcement may be comprised in a data carousel that is provided by broadcast or multicast in the service area 105.

In some embodiments, the present action may comprise that: The first user equipment 120 receives the digital content from the provided broadcast or multicast. The user equipment stores, independent on the registered request for one or more digital contents that are recommended, the received digital content in an internal storage. The first user equipment 120 checks the internal storage for the digital content that is recommended.

This action may correspond fully or partially to the previously described Actions 307-308 and Actions 408, 410.

Action 703

The first user equipment 120 displays, in response to the identified digital content, a representation of the digital content, which representation is selectable for access to the digital content.

In some embodiment where the tag is comprised in the message as discussed above for action 702, the present action may be executed in response to it has been determined that the digital content is relevant to be recommended based on the tag and a user profile of and/or setting in the first user equipment 120.

This action may correspond fully or partially to the previously described Action 309 and Action 407.

Figure 8:
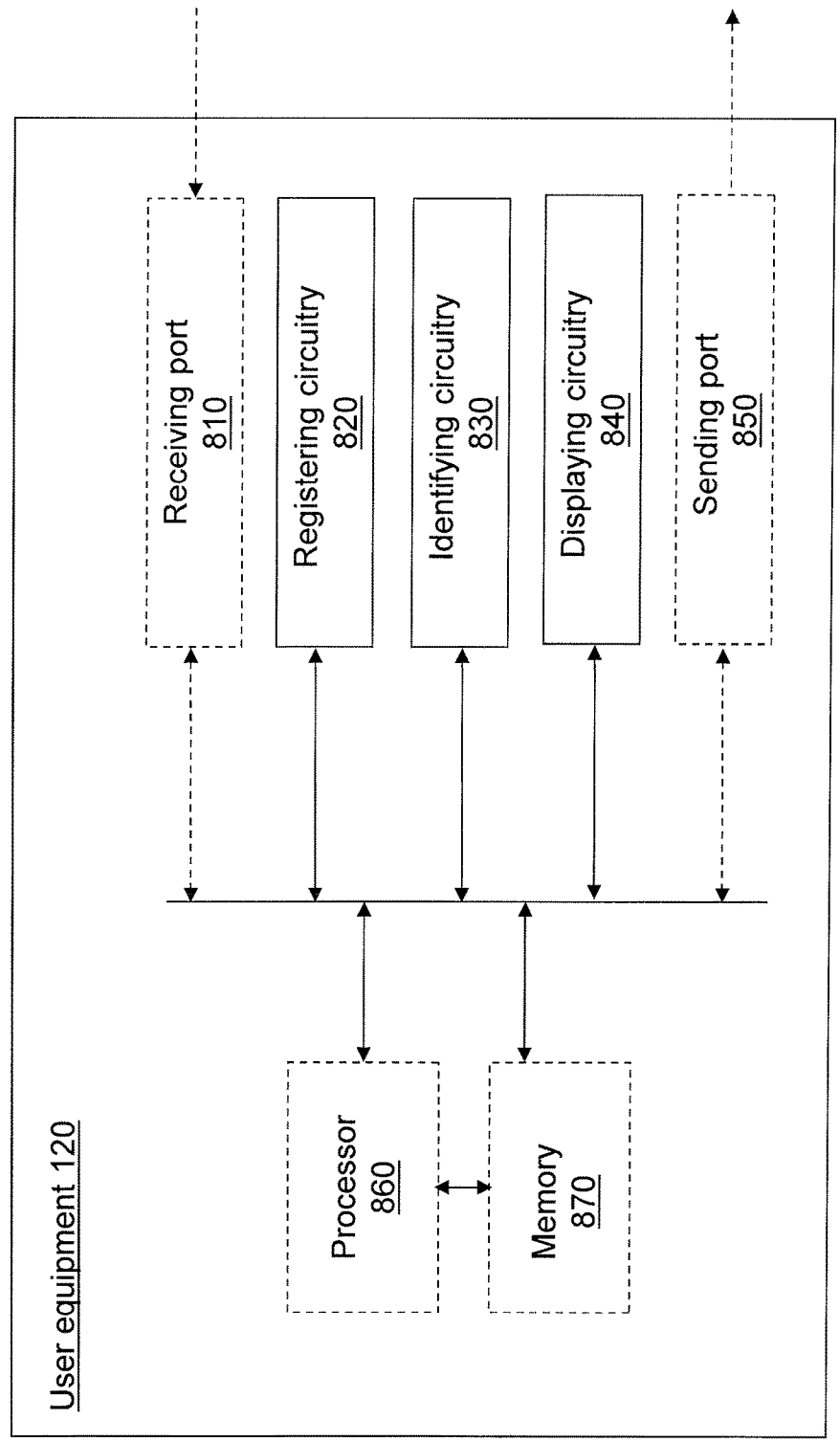
FIG. 8 is a schematic block diagram illustrating a user equipment according to embodiments herein.

To perform the actions above for accessing recommended digital content, the first user equipment 120 may comprise an arrangement schematically depicted in FIG. 8. As mentioned above, the first user equipment 120 is served by the base station 110 in the cellular communications network 100.

The first user equipment 120 comprises a registering circuitry 820, configured to register the request for one or more digital contents that are recommended.

The first user equipment 120 further comprises an identifying circuitry 830, configured to identify, in response to the registered request, the digital content that is recommended and available from broadcast or multicast by the base station 110.

In some embodiments, the identifying circuitry 830 is further configured to receive, from the base station 110, the message that requests the first user equipment 120 to display the representation.

Further, in some embodiments, the identifying circuitry 830 is further configured to receive the digital content from the provided broadcast or multicast via the base station 110, to store, independent on the registered request, the received digital content in an internal storage, and to check the internal storage for the digital content that is recommended.

The first user equipment 120 further comprises a displaying circuitry 840, configured to display, in response to the identified digital content, the representation of the digital content, which representation is selectable for access to the digital content. In some embodiments the displaying circuitry 840 is configured to do the displaying in response to that it has been determined that the digital content is relevant to be recommended based on the tag and a user profile of and/or setting in the first user equipment 120.

The first user equipment 120 may also comprises a receiving port 810 that may be configured to receive information from and be involved in communication with the base station 110.

The first user equipment 120 may further comprise a sending port 850 that may be configured to send information to and be involved in communication with the base station 110.

The embodiments of the first user equipment 120 may be implemented through one or more processors, such as a processor 860 in the first user equipment 120 depicted in FIG. 8, together with computer program code for performing the functions and actions of embodiments herein. In some embodiments the circuitry discussed above may be fully or partially implemented by the processor 860.

The computer program code mentioned above may also be provided as a computer program product, for instance in the form of a data carrier carrying computer program code for performing the embodiments herein when being loaded into the in the first user equipment 120. One such carrier may be in the form of a CD or DVD. It is however feasible with other data carriers such as a memory stick, memory card or hard drive. The computer program code may furthermore be provided as pure program code on a server for download to the first user equipment 120. The computer program code may furthermore be provided in the form of a data file or files on, or available through, a server for download. The file or files may be executable files for direct or indirect download to and execution on the first user equipment 120, or may be for intermediate download and compilation to make them executable before download to and for execution in the first user equipment 120. The server may be accessible over a computer network, such as the Internet, and may e.g. be a web or ftp server.

The first user equipment 120 may further comprise a memory 870 comprising one or more memory units. The memory 870 is arranged to store data, such as the Service Announcement during and after it has been received, and configurations and/or applications to perform the method when being executed in the first user equipment 120.

Those skilled in the art will also appreciate that the circuitry and ports 810-850 may refer to a combination of analog and digital circuits, and/or one or more processors configured with software and/or firmware (e.g., stored in memory) that, when executed by the one or more processors such as the processor 860, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Many embodiments and examples that have been described and discussed herein relate to LTE and LTE based systems, in particular such that has been enhanced with MBMS functionality, such as eMBMS. However, this is not to be construed as limiting embodiments herein to only LTE based cellular communications networks and not necessarily to only cellular communications networks enhanced with MBMS functionality.

Generally, embodiments herein are not limited to the above described preferred embodiments. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a Broadcast Management unit for recommending and providing digital content to a user equipment (UE) being served by a base station in a cellular communications network, wherein the base station is comprised in a radio access network of the cellular communications network and the Broadcast Management unit is comprised in a core network of the cellular communications network, the method comprising:
    deciding to recommend a digital content to the UE and one or more additional UEs, wherein the UE and the one or more additional UEs are located in a service area, and the deciding comprises: i) determining a number of UEs located in the service area for which said digital content is relevant and ii) determining whether the determined number of UEs located in the service area for which said digital content is relevant exceeds a threshold, and
    in response to deciding to recommend the digital content, transmitting the digital content in the service area, thereby enabling reception of the digital content by the UE via the base station and by said one or more additional UEs in the service area, wherein transmitting the digital content comprises one of: broadcasting the digital content in the service area and multicasting the digital content in the service area.

2. The method as claimed in claim 1, wherein the method further comprises:
    providing a sending of a message from the base station to the UE, which message requests the UE to display a representation of the digital content, which representation is selectable for access to the digital content.

3. The method as claimed in claim 2, wherein the message comprises an identifier that enables the UE to identify the digital content, among other digital content that is provided by broadcast or multicast, as such digital content that has been decided to be recommended.

4. The method as claimed in claim 2, wherein the message comprises a tag that is unique for one or more profile groups of a plurality of UEs, for which profile groups the digital content is relevant to be recommended, wherein each profile group comprises a plurality of UEs that are associated with similar user profiles and/or settings.

5. The method as claimed in claim 2, wherein the message comprises a service announcement that identifies the digital content and the availability of the digital content in the provided broadcast or multicast.

6. The method as claimed in claim 5, wherein the service announcement is comprised in a data carousel that is provided by broadcast or multicast in the service area.

7. The method as claimed in claim 1, wherein the deciding is based on feedback regarding the digital content from a plurality of UEs that have already recommended the digital content by displaying a representation of the digital content, which representation is selectable for access to the digital content.

8. The method as claimed in claim 1, wherein the deciding is based on a measure associated with how many times the digital content has been requested by a plurality of UEs in the cellular communications network.

9. The method as claimed in claim 1, wherein a measure associated with how many of a plurality of UEs that are relevant for recommendation of the digital content is based on one or more of:
   user profiles and/or user settings associated with the plurality of UEs in the cellular communications network;
   positions of the plurality of UEs in the cellular communications network;
   movement patterns of the plurality of UEs in the cellular communications network;
   availability of new content to the plurality of UEs in the cellular communications network; and
   similarity of one or more measures between a present situation and a historical situation.

10. The method as claimed in claim 1, wherein the deciding is based on one or more of the following:
   a data type associated with the digital content;
   a size of the digital content;
   a bandwidth requirement associated with the digital content; and
   a lifetime of the digital content.

11. The method as claimed in claim 1, wherein the provided broadcast or multicast in the service area uses cell capacity that else would be unused.

12. A method in a user equipment (UE) for accessing recommended digital content, the UE being served by a base station in a cellular communications network, the method comprising:
   registering a request for recommended content,
   identifying whether a digital content that is available from broadcast or multicast by the base station is relevant to the UE, and
   in response to identifying that the digital content is relevant to the UE, displaying a representation of the digital content, which representation is selectable for access to the digital content, wherein the identifying comprises:
   receiving, from the base station, a message comprising a tag that is unique for a profile group of a plurality of UEs for which profile group the digital content is relevant, wherein the profile group comprises UEs that are associated with similar user profiles and/or settings, and
   determining, based on the tag and based on a user profile and/or setting stored in the UE, whether the digital content is relevant.

13. The method as claimed in claim 12, wherein the message comprises an identifier that enables the UE to identify the digital content, among other digital content in the provided broadcast or multicast, as such digital content that has been decided to be recommended.

14. The method as claimed in claim 12, wherein the message comprises a service announcement that identifies the digital content and the availability of the digital content in the provided broadcast or multicast.

15. The method as claimed in claim 14, wherein the service announcement is comprised in a data carousel that is provided by broadcast or multicast in the service area.

16. The method as claimed in claim 12, wherein the identifying comprises:
   receiving the digital content from the provided broadcast or multicast via the base station,
   storing, independent on the registered request, the received digital content in an internal storage, and
   checking the internal storage for the digital content that is recommended.

17. A Broadcast Management unit for recommending and providing digital content to a user equipment (UE) served by a base station in a cellular communications network, wherein the base station is comprised in a radio access network of the cellular communications network and the Broadcast Management unit is comprised in a core network of the cellular communications network, the Broadcast Management unit comprising:
   a deciding circuitry, configured to decide to recommend a digital content to the UE and one or more additional UEs, wherein the UE and the one or more additional UEs are located in a service area, and the deciding comprises: i) determining a number of UEs located in the service area for which said digital content is relevant and ii) determining whether the determined number of UEs located in the service area for which said digital content is relevant exceeds a threshold, and
   a transmitting circuitry, configured to, in response to deciding to recommend the digital content, transmit the digital content in the service area, thereby enabling reception of the digital content by the UE via the base station and by said one or more additional UEs in the service area, wherein transmitting the digital content comprises one of: broadcast the digital content in the service area and multicast the digital content in the service area.

18. The Broadcast Management unit as claimed in claim 17, wherein the transmitting circuitry is further configured to transmit a message from the base station to the UE, which message requests the UE to display a representation of the digital content, which representation is selectable for access to the digital content.

19. The Broadcast Management unit as claimed in claim 18, wherein the message comprises an identifier that enables the UE to identify the digital content, among other digital content that is provided by broadcast or multicast, as such digital content that has been decided to be recommended.

20. The Broadcast Management unit as claimed in claim 17, wherein the message comprises a tag that is unique for one or more profile groups of a plurality of UEs, for which profile groups the digital content is relevant to be recommended, wherein each profile group comprises a plurality of UEs that are associated with similar user profiles and/or settings.

21. The Broadcast Management unit as claimed in claim 17, wherein the message comprises a service announcement that identifies the digital content and the availability of the digital content in the provided broadcast or multicast.

22. The Broadcast Management unit as claimed in claim 21, wherein the service announcement is comprised in a data carousel that the transmitting circuitry is configured to transmit by broadcast or multicast in the service area.

23. The Broadcast Management unit as claimed in claim 17, wherein the deciding circuitry is configured to make the decision based on feedback regarding the digital content from a plurality of UEs that have already recommended the digital content by displaying a representation of the digital content, which representation is selectable for access to the digital content.

24. The Broadcast Management unit as claimed in claim 17, wherein the deciding circuitry is configured to make the decision based on a measure associated with how many times the digital content has been requested by a plurality of UEs in the cellular communications network.

25. The Broadcast Management unit as claimed in claim 17, wherein a measure associated with how many of a plurality of UEs that are relevant for recommendation of the digital content is based on one or more of:
    user profiles and/or user settings associated with a plurality of UEs in the cellular communications network;
    positions of the plurality of UEs in the cellular communications network;
    movement patterns of the plurality of UEs in the cellular communications network;
    availability of new content to the plurality of UEs in the cellular communications network; and
    similarity of one or more measures between a present situation and a historical situation.

26. The Broadcast Management unit as claimed in claim 17, wherein the deciding circuitry is configured to make the decision based on one or more of the following:
    a data type associated with the digital content;
    a size of the digital content;
    a bandwidth requirement associated with the digital content; and
    a lifetime of the digital content.

27. The Broadcast Management unit as claimed in claim 17, wherein the transmitting circuitry is configured to transmit the broadcast or multicast in the service area so that the broadcast or multicast uses cell capacity that else would be unused.

28. A user equipment (UE) for accessing recommended digital content, wherein the UE is configured to be served by a base station in a cellular communications network, the UE comprising:
    a registering circuitry, configured to register a request for recommended content,
    an identifying circuitry, configured to identify whether a digital content that is available from broadcast or multicast by the base station is relevant to the UE, wherein the identifying circuitry is further configured to receive, from the base station, a message comprising a tag that is unique for a profile group of a plurality of UEs for which profile group the digital content is relevant, wherein the profile group comprises UEs that are associated with similar user profiles and/or settings, and
    a displaying circuitry, configured to display, in response to identifying that the digital content is relevant to the UE, a representation of the digital content, which representation is selectable for access to the digital content, wherein the displaying is made in response to determining, based on the tag and based on a user profile and/or settings stored in the UE, whether the digital content is relevant.

29. The user equipment as claimed in claim 28, wherein the message comprises an identifier that enables the UE to identify the digital content, among other digital content in the provided broadcast or multicast, as such digital content that has been decided to be recommended.

30. The user equipment as claimed in claim 28, wherein the message comprises a service announcement that identifies the digital content and the availability of the digital content in the provided broadcast or multicast.

31. The user equipment as claimed in claim 30, wherein the service announcement is comprised in a data carousel that is provided by broadcast or multicast in the service area.

32. The user equipment as claimed in claim 28, wherein the identifying circuitry is further configured to receive the digital content from the provided broadcast or multicast via the base station, to store, independent on the registered request, the received digital content in an internal storage, and to check the internal storage for the digital content that is recommended.

* * * * *